United States Patent
Kaplan et al.

(10) Patent No.: US 7,272,753 B2
(45) Date of Patent: Sep. 18, 2007

(54) METHODS AND APPARATUS FOR TRANSLATING APPLICATION TESTS FOR EXECUTION WITH SIMULATION SOFTWARE TOOLS

(75) Inventors: Matthew M. Kaplan, New York, NY (US); Amitkumar M. Paradkar, Mohegan Lake, NY (US); Clay E. Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/881,193

(22) Filed: Jun. 30, 2004

(65) Prior Publication Data

US 2006/0005079 A1   Jan. 5, 2006

(51) Int. Cl.
*G06F 11/00* (2006.01)

(52) U.S. Cl. ...................................................... 714/38

(58) Field of Classification Search ................. 714/38, 714/39, 26; 717/124, 126, 131, 132
See application file for complete search history.

(56) References Cited

U.S. PATENT DOCUMENTS

| | | | |
|---|---|---|---|
| 5,600,789 A * | 2/1997 | Parker et al. ................. 714/38 |
| 6,002,871 A * | 12/1999 | Duggan et al. ............. 717/135 |
| 6,993,748 B2 * | 1/2006 | Schaefer ..................... 717/124 |
| 2002/0083216 A1* | 6/2002 | Hickson et al. ............. 709/319 |
| 2003/0135508 A1* | 7/2003 | Chorafakis et al. ......... 707/100 |

* cited by examiner

*Primary Examiner*—Nadeem Iqbal
(74) *Attorney, Agent, or Firm*—Douglas W. Cameron; Ryan, Mason & Lewis, LLP

(57) ABSTRACT

A method for assessing computer system conformance with at least one requirement is provided. A first encoding of software commands is translated into a second encoding of software commands for use with a test-automation tool. The second encoding of software commands is processed to simulate at least one user interaction with the computer system through the test-automation tool.

23 Claims, 5 Drawing Sheets

METHODS AND APPARATUS FOR TRANSLATING APPLICATION TESTS FOR EXECUTION WITH SIMULATION SOFTWARE TOOLS

FIELD OF THE INVENTION

The present invention relates generally to test scripts and GUI commands and, more particularly, to methods and apparatus for translating GUI application tests for execution with one or more GUI simulation software tools.

BACKGROUND OF THE INVENTION

A graphical user interface (GUI) test (hereinafter referred to as "test") is a sequence of interactions with a computer system or software under test (hereinafter referred to as "SUT"). The test communicates with its users by obtaining input and providing output through a GUI, for the purpose of assessing the conformance of the system in relation to a set of system requirements.

Because these tests are often repeated, the sequence of operations is often recorded in the form of a test script (hereinafter referred to as "script"). A script is an encoding of the test in a form that is acceptable to a software program called a test-automation tool (hereinafter referred to as "tool"). Given a script in acceptable form, the tool can simulate a user performing the test's interactions with the SUT, and record and analyze test results.

While the interactions or operations typically need to be reproducible for testing purposes, this sequence is not fixed for all executions of the script. The effects of previous interactions can influence the order or presence of particular test interactions, as can other manifestations of tool state when executing a script. The decisions that determine which sequence of interactions will be performed when executing a script are called test logic (hereinafter referred to as "logic").

In automated test execution, a script's logic is typically encoded in the form of a software program. This program contains GUI-interaction commands (hereinafter referred to as "GUI commands") that, when executed, simulate particular user interactions through the SUT GUI. It is the script's logic that determines which GUI commands are executed, how frequently, and in what order. GUI commands generally take the form of GUI calls; more specifically, function-, procedure-, or object-oriented method-calls to tool-specific methods that cause the specified user interaction to be simulated.

A GUI command is characterized by the particular GUI control(s), also known as widget(s), that it causes to be exercised, and by any data that is input to, or read from, these controls. Examples of such data are text strings that are presented to the SUT through the GUI, or that are presented to the user (or tool) by being displayed in the GUI. Other examples include screen locations, encoded as coordinates of the cursor at the time when GUI events, such as keyboard input or mouse clicks, take place. GUI command data is communicated through GUI calls by parameters and return values. Such GUI controls are identified in one of three ways:

1) as a parameter to the GUI call, for example:

PushRadioButton(GuiRoot.custInfo.title, "Dr.").

2) as the object to which the GUI call is applied, in an object-oriented method call, for example:

GuiRoot.custInfo.name.setText("Pablo Santiago"); and

Browser( ).Page("customerInfo").childNamed("nameText").

3) through context (e.g., a "selected" or "current" object maintained by the script or tool) that may be set using a call or assignment to script or system variable, for example:

Browser( ).Page("customerInfo").childNamed("nameText").select( ); and

Browser( ).inputChars("Pablo Santiago");—text field in context

Numerous tools are available, each with their own script acceptability requirements. This poses a problem when the tool for which a script was created is unavailable to those charged with executing the test. This may occur in numerous situations. For example, this may occur when tests are shared between groups with different automation policies; when tools that are used are changed due to licensing cost concerns; and when tools have become obsolete while test assets retain value. In such situations, the original scripts must be translated in order to be executed. Scripts are a form of computer program, and the translation of programs, in general, poses a very difficult problem. Translation by hand is very expensive, especially when a large number of tests exist, as is often the case. Thus, a need exists for automated script translation techniques that overcome these and other limitations.

SUMMARY OF THE INVENTION

The present invention describes methods and apparatus that can be used to translate GUI test scripts. More particularly, the invention converts GUI commands from an encoding of an original tool to the encoding of a second tool for the purpose of script translation.

For example, in one aspect of the invention, a method for assessing computer system conformance with at least one requirement is provided. A first encoding of software commands is translated into a second encoding of software commands for use with a test-automation tool. The second encoding of software commands is processed to simulate at least one user interaction with the computer system through the test-automation tool.

In an additional aspect of the present invention, in translating a first encoding of software commands a source command protocol for a software command is translated into at least one target command protocol; at least one command property for a software command is translated into at least one target command property; and at least one source control reference for a software command is translated into at least one target control reference.

Advantageously, the present invention allows scripts to be easily translated to meet the script acceptability requirements of a tool in a given system.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any system in which it is desirable to translate a script to meet script requirements of a given tool.

As will be illustrated in detail below, the present invention introduces techniques for translating test scripts for assessing a system's conformance to system requirements and, more particularly, for converting GUI commands from an encoding of an original tool to the encoding of a second tool for the purpose of script translation.

Figure 1:
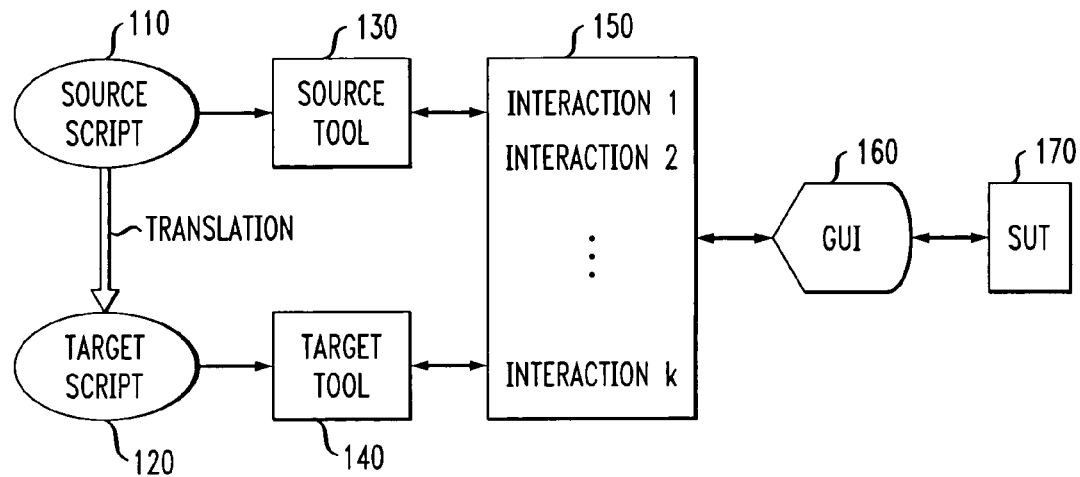
FIG. 1 is a flow diagram illustrating a system conformance assessment methodology with script translation, according to an embodiment of the present invention.

Referring initially to FIG. 1, a flow diagram illustrates a system conformance assessment methodology with script translation, according to an embodiment of the present invention. An original or source script 110 is translated into a target script 120. A source tool 130 accepts source script 110, while a target tool 140, accepts target script 120. Source tool 130 and target tool 140 process their respective scripts, simulating an identical sequence of user interactions 150 for use with GUI 160 and SUT 170.

Tools have proprietary formats for GUI commands. In order to execute the translated or target script 120 using target tool 140, it is necessary to translate the form of GUI commands from the encoding used by source tool 130 to that used by target tool 140.

GUI commands encode a command protocol consisting of a sequence of one or more commands that accomplish a GUI interaction and, for each command in the protocol: (a) a command name; (b) command properties; and (c) control references, which specify the identity of the control to which simulated user interactions will be directed. Each of these command components must be recast in a manner acceptable by target tool 140 to produce the same input as source tool 130 to the SUT GUI during execution of the translated GUI command. These three types of translation may be accomplished as described below.

Figure 2:
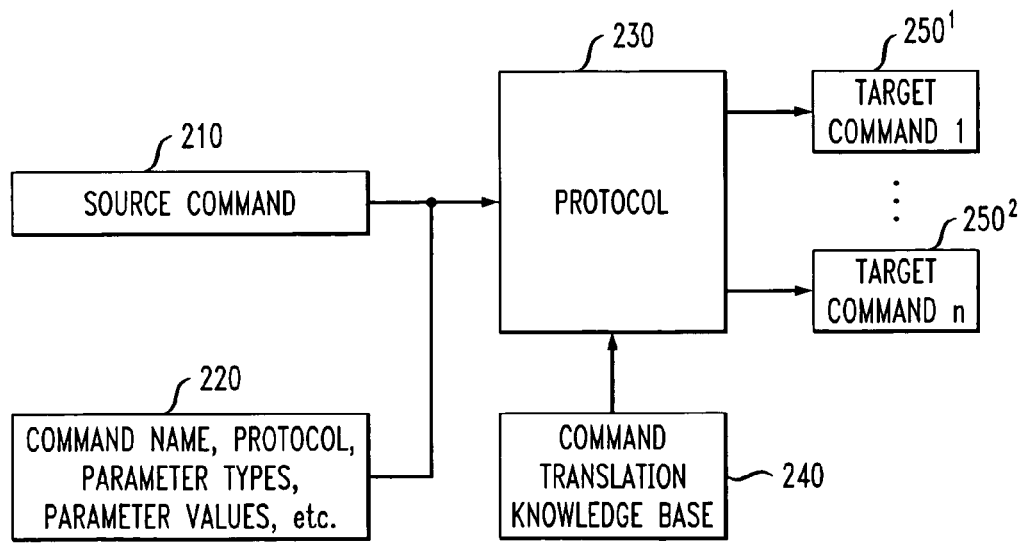
FIG. 2 is a flow diagram illustrating a command protocol translation methodology, according to an embodiment of the present invention.

First, regarding a command protocol and referring to FIG. 2, a flow diagram illustrates a command protocol translation methodology, according to an embodiment of the present invention. A source command 210 having significant properties 220 undergoes protocol translation 230 through the use of a command translation knowledge base 240. The command translation knowledge base includes a table that specifies, for each source command name and for properties applicable to that command, a common schema. This schema determines what sequence of target commands are to be used to translate the source commands as well as to set target-command properties, in terms of source properties, property modifiers, and constants. Protocol translation 230 results in one or more target commands $250^1$, $250^2$. The sequence of target script commands is determined by examining significant properties of the source script command, such as command name, names, types, lifetimes (e.g., constant) and values of parameters.

Figure 3:
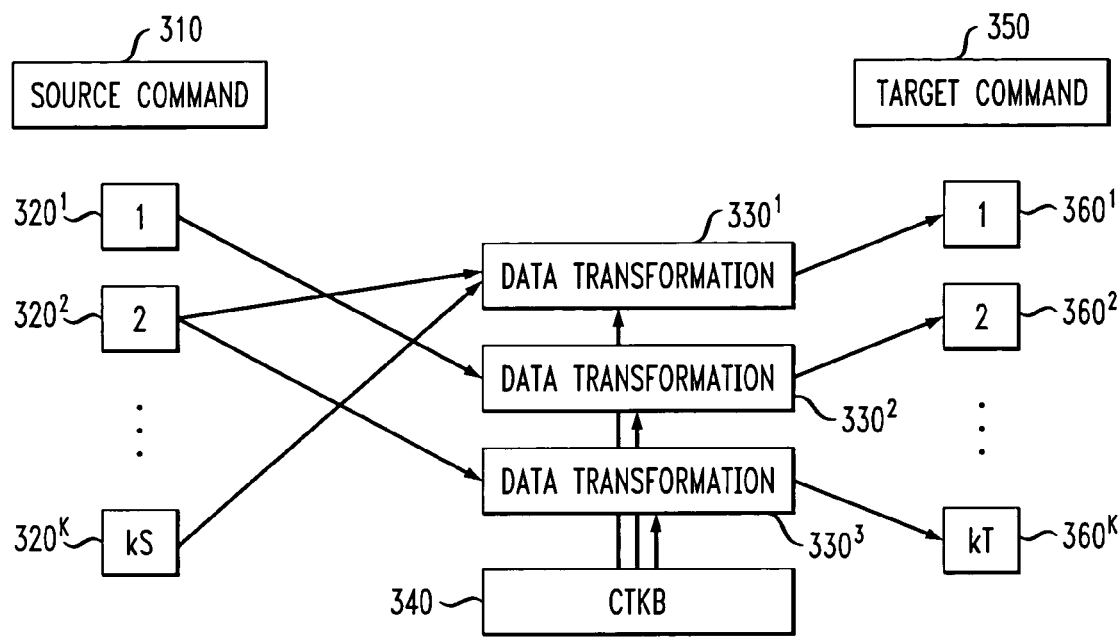
FIG. 3 is a flow diagram illustrating a command properties translation methodology, according to an embodiment of the present invention.

Second, regarding command properties, and referring to FIG. 3, a flow diagram illustrates a command property translation methodology, according to an embodiment of the present invention. Data values supplied to commands may be encoded in a tool-specific manner, which are translated and encoded in the target. The input in this methodology includes properties $320^1$, $320^2$, $320^m$ of source command 310, which may include the command's name and parameter information, such as number, type, lifetime (e.g., constant) and values. Properties $360^1$, $360^2$, $360^m$ of a target command 350 drive the methodology as well. Each required property $360^1$, $360^2$, $360^m$ of target command 350 is obtained by analysis and transformation of source command properties $320^1$, $320^2$, $320^m$, in accordance with specifications present in a command-translation knowledge base 340 for data transformations $330^1$, $330^2$, $330^3$. Through data transformations $330^1$, $330^2$, $330^3$, a single source command property $320^1$ may be used for a single data transformation $330^2$ into target command property $360^2$; multiple source command properties $320^2$, $320^m$ may be used for a single data transformation $330'$ into target command property $360^1$; and a single source command property $320^2$ may be used for multiple data transformations $330^1$, $330^3$ into target command properties $360^1$, $360^m$.

Figure 4:
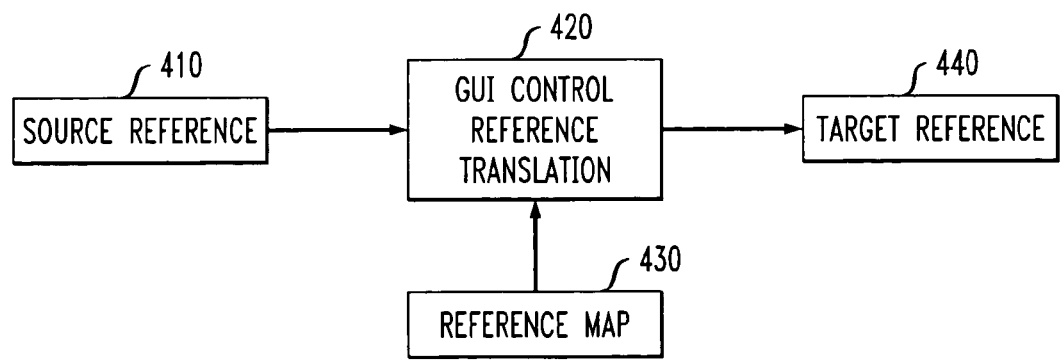
FIG. 4 is a flow diagram illustrating a GUI control reference translation methodology for a fixed reference, according to an embodiment of the present invention.
Figure 5:
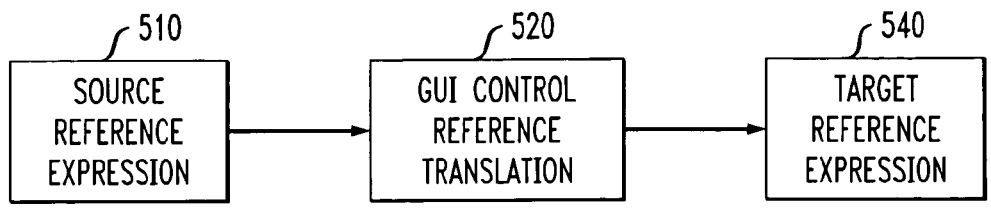
FIG. 5 is a flow diagram illustrating an expression transformation methodology for a variable reference, according to an embodiment of the present invention.
Figure 6:
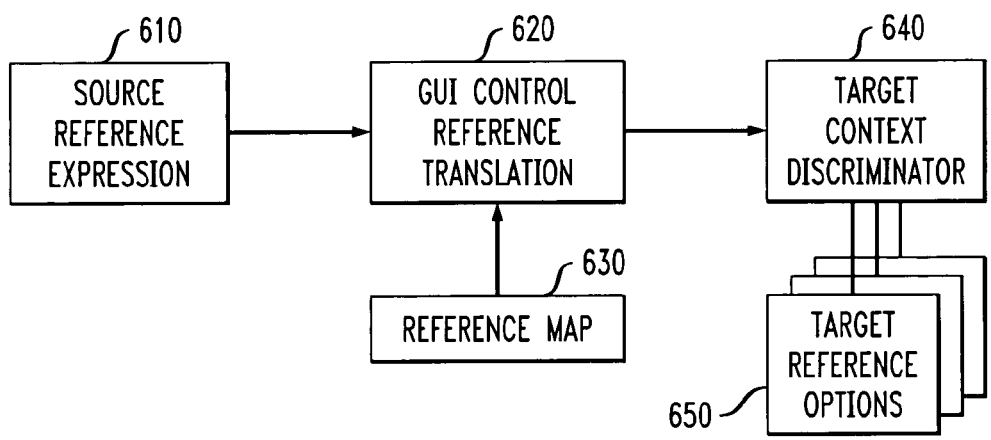
FIG. 6 is a flow diagram illustrating a discriminated expression translation methodology for a variable reference, according to an embodiment of the present invention.

Third, regarding control references, methodologies for fixed and variable references are described in FIGS. 4-6. Referring now to FIG. 4, a flow diagram illustrates a GUI control reference translation methodology for fixed references, according to an embodiment of the present invention. Although the SUT and its GUI are common to the source- and target-scripts, the references to these GUI controls are tool-specific and must be translated. Often these references are fixed, i.e. a particular reference always refers to the same GUI control. In these cases, source reference 410 can undergo GUI control reference translation 420 using a straightforward mapping process of reference map 430 to obtain a target reference 440. The mapping can be obtained by automated examination and analysis of tools and scripts for the source and target, with reference to the SUT GUI (for example, HTML scripts or internal representations of programmatically-constructed GUI's). Additionally, user input can be used to help construct the control reference mapping.

In other cases, the control references may be variable. For example, a reference may designate a different GUI control when evaluated at different times. In this case, the reference is translated into a process that obtains relevant system properties (e.g., values of variables of the GUI state), and analyzes these properties when the reference is evaluated to identify a unique GUI control. Such a process would be specified via target script code within the reference map.

Referring now to FIG. 5, a flow diagram illustrates a regular expression transformation methodology for variable references, according to an embodiment of the present invention. A reference may specify a widget via a "regular expression" in which the name is only partly specified. Source reference expression 510 undergoes GUI control reference translation 520 to produce a target reference expression 540. In this case all controls within the context specified by the reference can be tested against the regular expression, and the one that matches the expression is the designated control. Regular expression formats differ somewhat from tool to tool, so the translation would specify an equivalent regular expression in the target tool script encoding. Thus, a map may not necessarily be needed since it may be included in the code for the web page (HTML).

Referring now to FIG. 6, a flow diagram illustrates a discriminated expression translation methodology for variable references, according to an embodiment of the present invention. A reference may depend on the values of one or more variables that may take one of a fixed set of values, each corresponding to a particular control or window. A source reference expression 610 undergoes GUI control reference translation 620 through a reference map 630 in order to produce target context discriminator 640 having one or more target reference options 650. These target reference options are the set of target controls or windows that correspond to source values that the source reference expression could assume, as specified in the reference map. The translation process in this case consists of invoking a device to determine which value or set of values is specified, thereby fully defining the control specified. For each such combination, a fixed control reference is produced as specified in fixed-reference case of FIG. 4 above. Therefore, FIG. 4 may be considered a variation of FIG. 6 having a one-to-one relationship.

A translation system using the above techniques is custom-built for a particular source and target tool encoding. If there is a need to translate between numerous source and target tools, this leads to a need for a large number of translation systems. This number is minimized by the use of a common test encoding (hereinafter referred to as "CTE"), as the central element of a two-stage translation technique.

Figure 7:
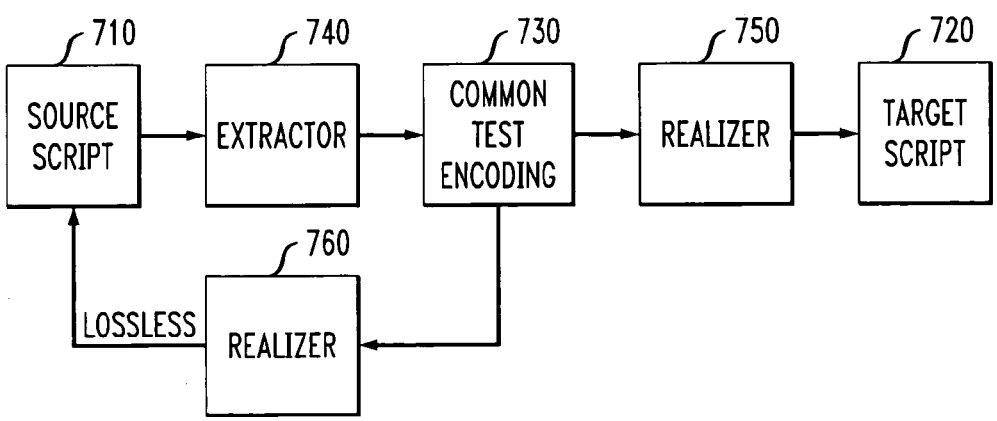
FIG. 7 is a flow diagram illustrating a common test encoding methodology for translation, according to an embodiment of the present invention.

Referring now to FIG. 7, a flow diagram illustrates a common test encoding methodology for script translation, according to an embodiment of the present invention. In this technique, translation from a source script 710 to a target script 720 is accomplished by first translating from source script 710 to CTE 730, through an extractor 740 (also referred to as CTE extraction). In a second stage, CTE 730 is translated to target script 720 through a realizer 750 (also referred to as realization from the CTE). In this way, translators are needed only between tools and the CTE, greatly reducing the total number of translators required.

The CTE is a highly expressive script encoding that need not be executable by any tool. Scripts for execution with any tool can be translated to CTE without any loss of information. When there is no loss of information the information in CTE encoding extracted from a script for any tool is sufficient to be realized as a script for the same tool, and the realized script, when executed, produces equivalent results to the original, as shown in FIG. 7 as realizer 760.

Realization of a test in CTE form as a target script is accomplished through a realization map. For each element of the test in CTE form, the realization map contains information that drives production of a target-script code, which causes the target tool to execute the content of the test element.

Figure 8:
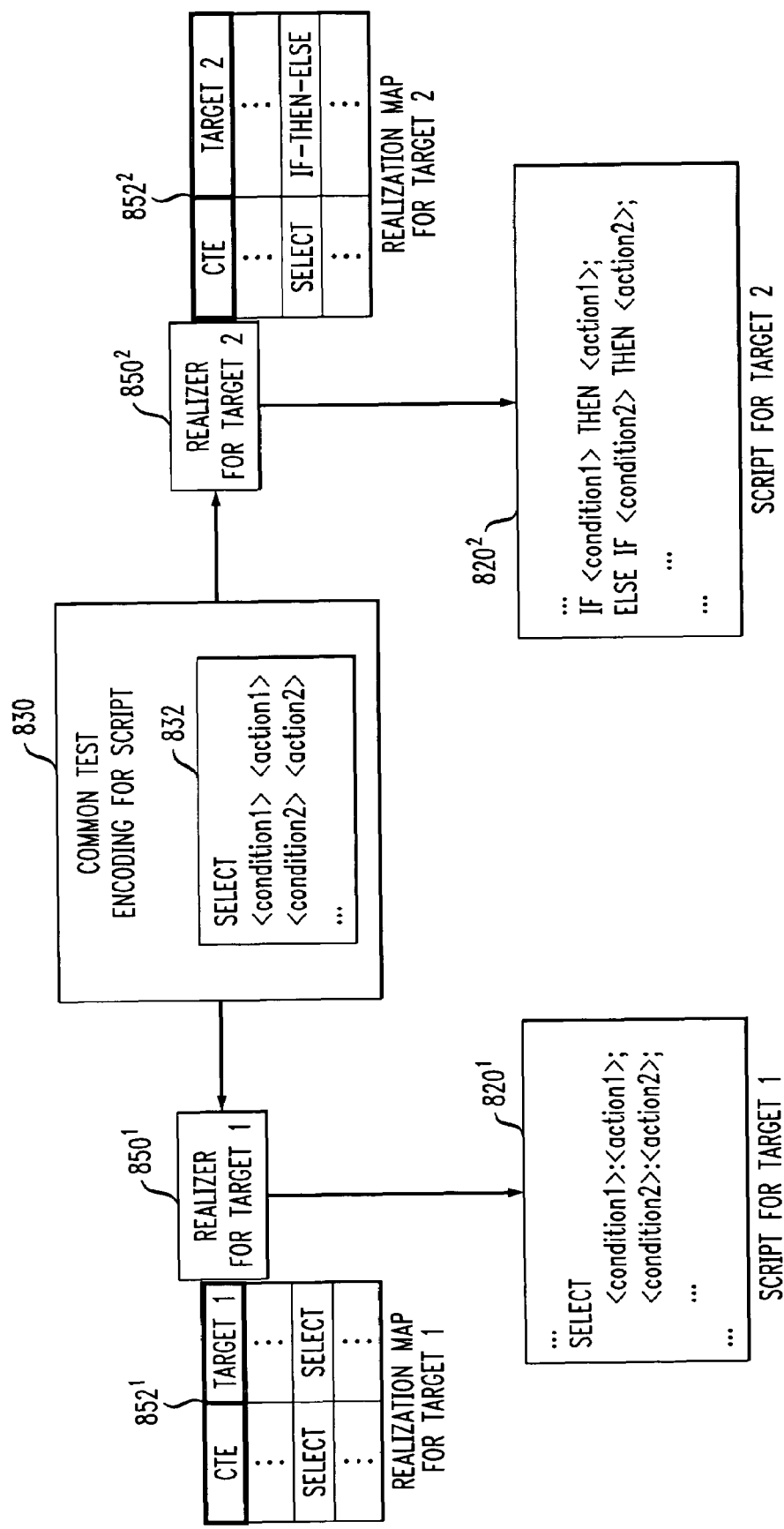
FIG. 8 is a flow diagram illustrating a realization map guides selection methodology of target script constructs for common test encoding elements, according to an embodiment of the present invention.

Referring now to FIG. 8, a flow diagram illustrates a realization map guides selection methodology of target script constructs for common test encoding elements, according to an embodiment of the present invention. CTE encoding 830 includes a generalized "Selection" construct 832 that chooses an action to perform based on a condition applied to the runtime test state. A realizer $850^1$ having a realization map $852^1$ for a target tool that includes a predicate-based select statement would realize CTE selection construct 832 using this statement, thus producing target script $820^1$. Realizer $850^2$ having realization map $852^2$ for a target tool that does not have a select statement may realize CTE selection construct 832 construct using a chain of IF-THEN-ELSE statements, thus producing target script $820^2$. Realization maps $852^1$, $852^2$ are an implementation of a command translation knowledge base as shown in FIGS. 2 and 3.

The CTE is also a central encoding used by test analysis tools to determine the degree to which tests exhibit desirable script properties. One such desirable script property is translatability. Because not all constructs or features used in a source script may be available in the target tool, realizers may not be able to produce a complete an accurate translation A realizer determines which sections of a CTE-form test cannot be converted to statements in the target script, in order to produce error diagnostics. Other desirable script properties checked by analysis of the CTE include test structuring or coding standards that are determined to increase maintainability of tests.

Analysis tools may provide feedback to test developers concerning individual statements in source scripts that include features that cannot be adequately translated into a target script, or otherwise limit the asset value of the source script. Providing this feedback enables test developers to avoid unnecessary use of such features in their scripts when the translation is known to be required. This is extremely difficult to accomplish without feedback provided by automated analysis.

Figure 9A:
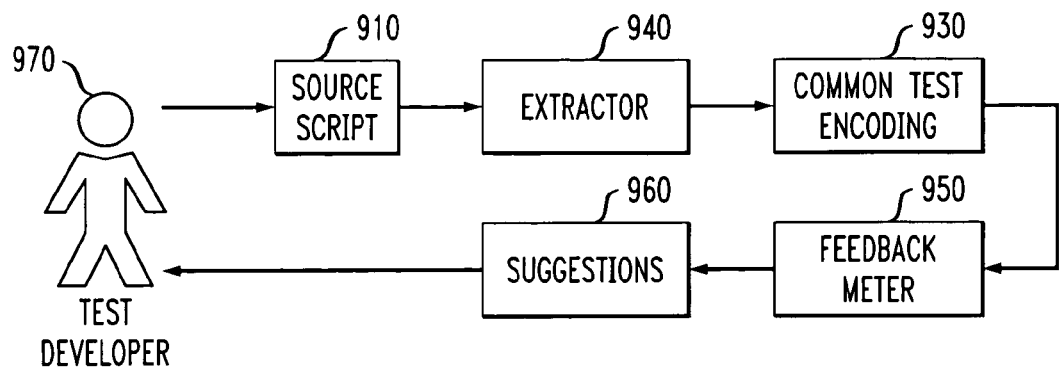
FIG. 9*a* is a flow diagram illustrating a test developer feedback methodology for common test encoding, according to an embodiment of the present invention.
Figure 9B:
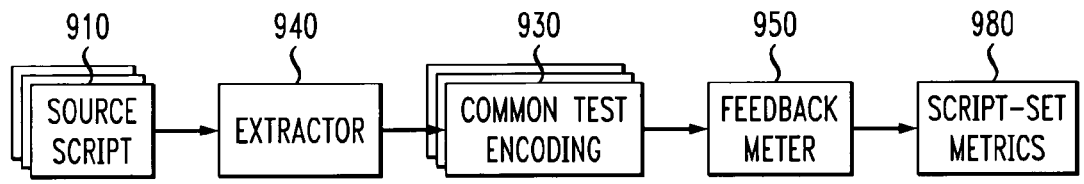
FIG. 9*b* is a flow diagram illustrating a script-set metrics methodology for common test encoding, according to an embodiment of the present invention.

Referring now to FIG. 9a, a flow diagram illustrates a test developer feedback and metrics methodology for common test encoding, according to an embodiment of the present invention. As also shown in FIG. 7, a source script 910 is translated to CTE 930 through extractor 940. Feedback meter 950 provides suggestions 960 to test developer 970. To provide adequate feedback, each significant section of a test in CTE 930 (representing, for example, a statement or procedure) must contain source script information, including script name and statement position, of statements that were extracted to yield that section of the test. In addition to CTE analysis providing feedback that guides test developers, analysis of groups of CTE 930 is used to determine measures that estimate potential reuse-value of existing test sets as shown as script-set metrics 980 in FIG. 9b.

Figure 10:
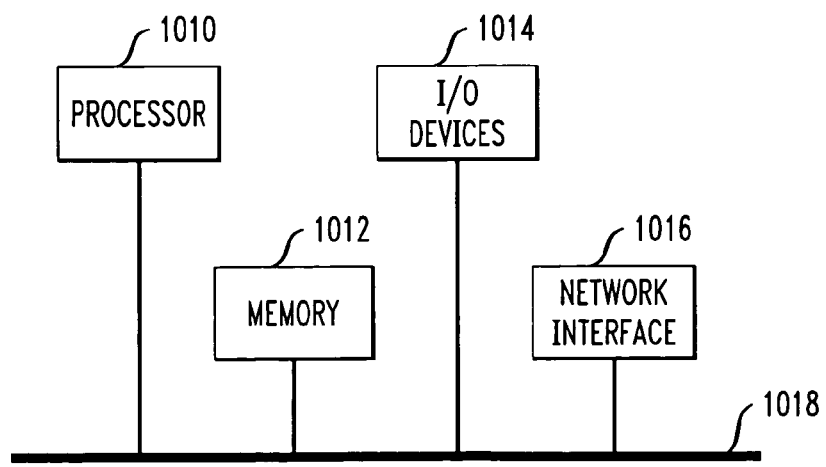
FIG. 10 is a diagram illustrating an illustrative hardware implementation of a computing system in accordance with which one or more components/methodologies of the present invention may be implemented, according to an embodiment of the present invention.

Referring now to FIG. 10, a block diagram illustrates an exemplary hardware implementation of a computing system in accordance with which one or more components/methodologies of the invention (e.g., components/methodologies described in the context of FIGS. 1-9b) may be implemented, according to an embodiment of the present invention. For instance, such a computing system in FIG. 10 may contain source script 110, target script 120, source tool 130, target tool 140, GUI 160 and SUT 107 of FIG. 1.

As shown, the computer system may be implemented in accordance with a processor 1010, a memory 1012, I/O devices 1014, and a network interface 1016, coupled via a computer bus 1018 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for testing the conformance of a computer system with at least one requirement, comprising the steps of:
   translating a first encoding of software commands into a second encoding of software commands for use with a test-automation tool, wherein the step of translating comprises the steps of converting the first encoding of software commands into an intermediate common encoding and converting the intermediate common encoding into the second encoding of software commands, wherein the intermediate common encoding is capable of being utilized to translate to and from encodings of software commands for a plurality of test-automation tools; and
   processing the second encoding of software commands in the test-automation tool to simulate at least one user interaction with the computer system.

2. The method of claim 1, wherein the step of translating a first encoding of software commands comprises the steps of:
   translating a source command protocol for a software command into at least one target command protocol;
   transforming at least one command property for a software command into at least one target command property; and
   translating at least one source control reference for a software command into at least one target control reference.

3. The method of claim 2, wherein the step of translating a source command protocol comprises the steps of:
   accepting a source command having at least one source command property;
   accessing a command translation knowledge base; and
   generating at least one target command.

4. The method of claim 2, wherein the step of transforming at least one source command property comprises the steps of:
   transforming data of at least one source command property through a command translation knowledge base; and
   generating at least one target command property.

5. The method of claim 4, wherein in the step of transforming data of at least one source command property, one source command property is used the transformation for one target command property.

6. The method of claim 4, wherein in the step of transforming data of at least one source command property, two or more source command properties are used in the transformation for one target command property.

7. The method of claim 4, wherein in the step of transforming data of at least one source command property, one source command property is used in the transformation for two or more target command properties.

8. The method of claim 2, wherein the step of translating at least one source control reference comprises the step of analyzing at least one source control reference through a reference map.

9. The method of claim 8, wherein in the step of translating at least one source control reference, one source control reference is translated into two or more target control references.

10. The method of claim 2, wherein in the step of translating at least one source control reference, the at least one source control reference is fixed.

11. The method of claim 2, wherein in the step of translating at least one source control reference, the at least one source control reference is variable.

12. The method of claim 1, wherein the step of translating a first encoding of software commands comprises the steps of:
   extracting a common test encoding from the first encoding of software commands; and
   realizing the second encoding of software commands for use with a test-automation tool from the common test encoding.

13. The method of claim 12, wherein the step of realizing the second encoding of software commands comprises the step of generating software commands through a realization map.

14. The method of claim 12, further comprising the steps of:
   determining if a section of a common test encoding cannot be converted to statements in the second encoding of software commands; and
   providing feedback to a test developer.

15. The method of claim 12, further comprising the step of estimating potential reuse-values of existing test sets.

16. Apparatus for assessing computer system conformance with at least one requirement, comprising:

a memory; and at least one processor coupled to the memory and operative to: (i) translate a first encoding of software commands into a second encoding of software commands for use with a test-automation tool, wherein the operation of translating further comprises converting the first encoding of software commands into an intermediate common encoding and converting the intermediate common encoding into the second encoding of software commands, wherein the intermediate common encoding is capable of being utilized to translate to and from encodings of software commands for a plurality of test-automation tools; and process the second encoding of software commands to simulate at least one user interaction with the computer system through the test-automation tool.

17. The apparatus of claim 16, wherein the operation of translating a first encoding of software commands comprises the operations of:

translating a source command protocol for a software command into at least one target command protocol;

transforming at least one command property for a software command into at least one target command property; and translating at least one source control reference for a software command into at least one target control reference.

18. The apparatus of claim 17, wherein the operation of translating a source command protocol comprises the operations of:

accepting a source command having at least one source command property;

accessing a command translation knowledge base; and generating at least one target command.

19. The apparatus of claim 17, wherein the operation of transforming at least one source command property comprises the operations of:

transforming data of at least one source command property though a command translation knowledge base; and generating at least one target command property.

20. The apparatus of claim 16, wherein the operation of translating a first encoding of software commands comprises the operations of:

extracting a common test encoding from the first encoding of software commands; and realizing the second encoding of software commands for use with a test-automation tool from the common test encoding.

21. The apparatus of claim 20, wherein the operation of realizing the second encoding of software commands comprises the operation of generating software commands through a realization map.

22. The apparatus of claim 20, further comprising the operations of:

determining if a section of a common test encoding cannot be converted to statements in the second encoding of software commands; and providing feedback to a test developer.

23. An article of manufacture for assessing computer system conformance with at least one requirement, comprising a machine readable medium containing one or more programs which when executed implement the steps of:

translating a first encoding of software commands into a second encoding of software commands for use with a test-automation tool, wherein the step of translating comprises the steps of converting the first encoding of software commands into an intermediate common encoding and converting the intermediate common encoding into the second encoding of software commands, wherein the intermediate common encoding is capable of being utilized to translate to and from encodings of software commands for a plurality of test-automation tools; and processing the second encoding of software commands to simulate at least one user interaction with the computer system through the test-automation tool.

* * * * *